March 21, 1933.  C. A. ALBRECHT  1,902,432
WIPING MECHANISM FOR MATRIX COMPOSING AND LINE CASTING MACHINES
Filed Oct. 1, 1931  2 Sheets-Sheet 1

Inventor
C. A. Albrecht
By Morrison, Kennedy, Caufield
Attorneys

March 21, 1933.   C. A. ALBRECHT   1,902,432
WIPING MECHANISM FOR MATRIX COMPOSING AND LINE CASTING MACHINES
Filed Oct. 1, 1931   2 Sheets-Sheet 2
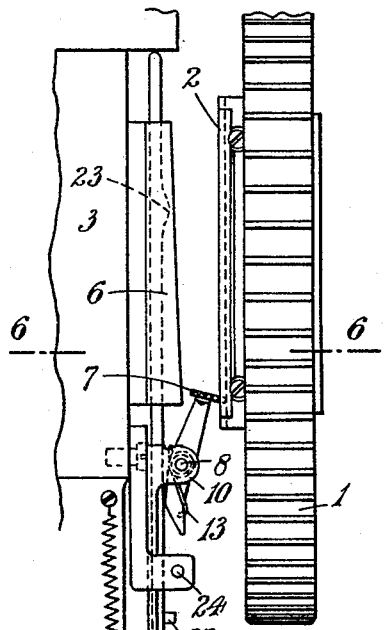
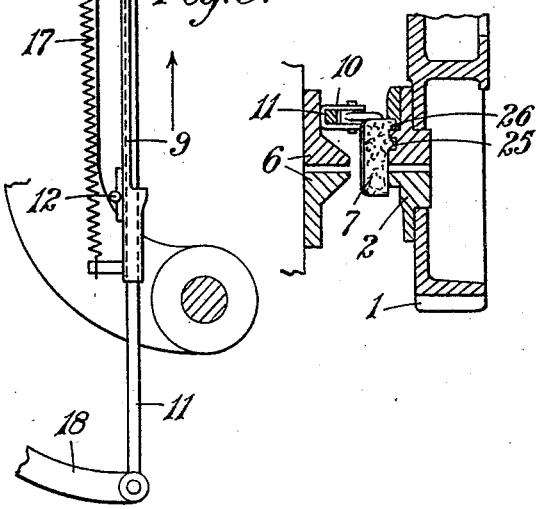
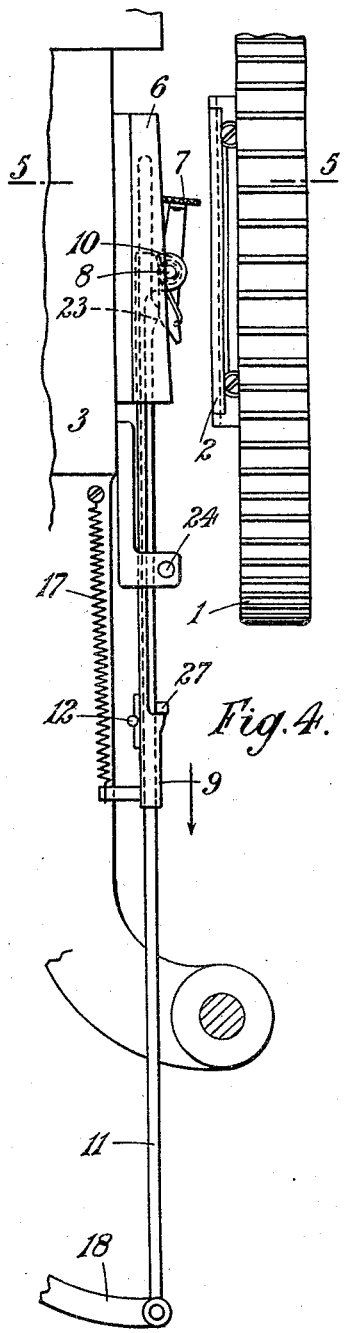
Inventor:
C. A. Albrecht Patented Mar. 21, 1933

1,902,432

UNITED STATES PATENT OFFICE

CHRISTIAN AUGUSTUS ALBRECHT, OF BERLIN, GERMANY, ASSIGNOR TO MERGENTHALER LINOTYPE COMPANY, OF BROOKLYN, NEW YORK, A COMPANY OF NEW YORK

WIPING MECHANISM FOR MATRIX COMPOSING AND LINE CASTING MACHINES

Application filed October 1, 1931, Serial No. 566,248, and in Germany October 7, 1930.

In matrix composing and line casting machines, it is necessary after the production of the cast slugs, to wipe both the mold and the trimming knives in order to remove any shavings that may still adhere thereto. For the wiping of the knives it is customary to use a wiper which moves in an upward direction and brushes along the knives. For the wiping of the mold as a general rule, a separate wiper is employed which is generally adapted to rock about a pivot. Wipers are preferably arranged to move transversely across the mold. These wipers have the disadvantage that in consequence of the rocking, a uniform wiping cannot be effected, and that shavings and dirt very frequently find their way into the mold slot. It must be added that, besides the mold slot, the grooves located beneath the mold slot on the mold, and in which the lugs of the matrices engage whilst a slug is cast, should also be cleaned, as otherwise dust and shavings will collect in these grooves and thus prevent the accurate alignment of the matrices.

It has also already been propesed to employ a common wiper for the knives and the mold, which operates by passing between them during their juxtaposition. It was only possible, however, for the wiper to clean one of the two parts with the desired thoroughness, so that the parts were not both wiped uniformly.

The present invention likewise relates to a wiper which wipes both the mold and the trmming knives. This wiper, however, is movably mounted on the mechanism actuating it, and is so controlled that when moved in one direction it will be brought into position on the mold and wipe it, and when moved in the other direction, it will bear against, and wipe the knife edges.

In the drawings and by way of example, one constructional form of the invention is illustrated, and in these drawings, Figure 1 is a side elevation of the pertinent parts of the machine in a position of rest;

Figure 3 shows, on a larger scale, the wiping of the mold;

Figure 4 shows the position of the respective parts during the wiping of the knives, and is likewise drawn to a larger scale;

Figure 6 is a section taken on the line 6—6 of Figure 3.

Figure 5:
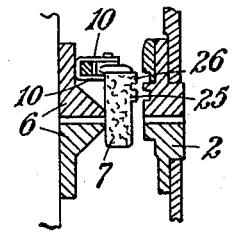
Figure 5 is a section taken on the line 5—5 of Figure 4.

In front of the mold disc 1 with the molds 2, is located the so-called vise frame 3, which is pivotally mounted in the known manner to turn about a pivot 4 supported on the machine frame and on which are carried the vise jaws 5, between which the matrix line is held during the casting operation. In the course of the casting operation, the selected mold is horizontal, the mold disc then occupying a position which is 90 degrees anti-clockwise of that shown in the drawings. The casting slot of the mold, is vertical in the ejecting position in whch it is shown in Figures 1 to 4. After the slug is cast, the mold disc is rotated 270 degrees so as to bring the mold immediately opposite the knives, that is to say, in the position in which it is illustrated in the drawings.

The knives 6 and the mold 2 must be wiped after the slug is cast. For this purpose, a wiper 7, is used which as shown particularly in Figures 3 and 4, is mounted at the end of a two-armed lever adapted to rock about a pivot or stud 8. The stud 8 is carried by a guide or so-called sleeve 9 which, for this purpose, is provided at its upper extremity with a yoke or lugs 10, acting as a bearing, and which is open over the greater part of its length so that the bar 11 on which the sleeve 9 is movable, is clearly visible. A stud 12 is provided upon the lower enclosed extremity of the sleeve 9. The lever carrying the wiper 7, is held in the position in which it is shown in Figure 3, by a torsion spring 13 encircling the pivot 8. The said spring tends to turn the lever clockwise, as viewed in Figures 1, 3 and 4, so as to induce the wiper 7 to bear against the mold 2. A further lever 14 or so-called detent, pivoted on the machine frame, is adapted to rock about its pivot 16 and at its upper end rest against an abutment or stop 15, (Figures 1 and 2) and at its lower end engage the stud 12 on the sleeve 9. A spring 17 tends to raise the sleeve 9 on the bar 11, but at certain junctures, is prevented from doing so by the detent 14. The lower end of the bar 11 is connected to a bar 19 (Figure 1) through a bracket 18. This bar 19 is guided on the vise frame 3 and is located at the side of the first elevator 20. The upper extremity of the bar 19 is adapted to bear against an abutment or stop 21 on the first elevator, and a spring 22 tends to raise the bar and hold it in engagement with said stop. Finally an enlargement or cam 23 is provided on the bar 11 near its upper extremity.

Figure 1:
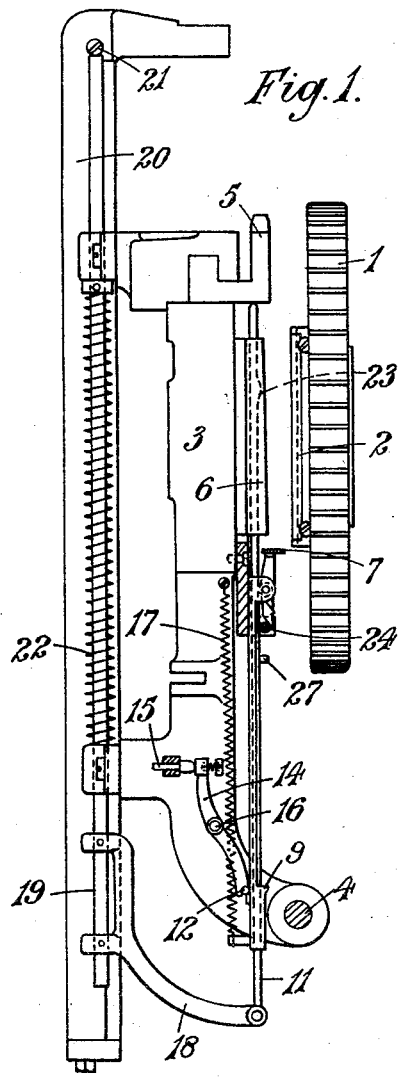
Figure 2:
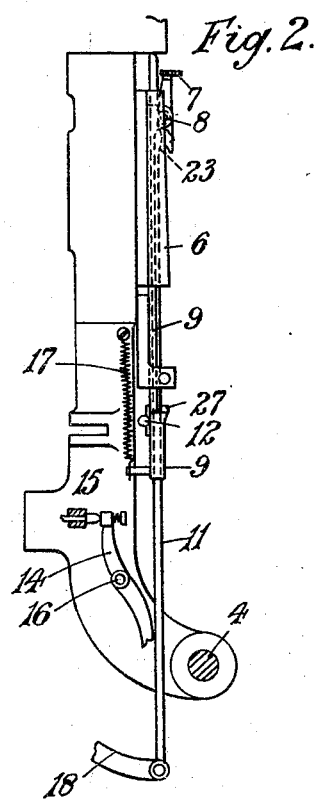
Figure 2 is a similar view with the wiper in its topmost position prior to the wiping of the knives.

The operation of the device is as follows:—
When the machine is at rest, the device is in the position shown in Figure 1, the sleeve 9 being then held in its lowest position by the detent 14 and the spring 17 extended. The lower arm of the wiper lever, which is inclined, has in this position traveled upward over a stationary stud 24 which brings the lever in the position illustrated in Figure 1. Now, as soon as the line has been sent away, the detent 14 is swung about its pivot 16 by a combination of levers, not shown in the drawings, so as to release the locking pin 12 on the sleeve 9. Consequently the latter, under the action of its spring 17 is quickly raised. As soon as the inclined surface of the wiper lever leaves the stud 24, the spring 10 moves the lever to the position shown in Figure 3, and wherein the wiper 7 bears against the mold 2, and, under the action of the spring 17 will move upwardly along and wipe the mold. As the wiper 7 as shown in Figures 5 and 6, is constructed so as to engage the grooves of the mold by its projections 25 and 26, not only the mouth of the mold but also the said grooves will be efficiently cleaned. When the wiper 7 has reached its topmost position, in which the mold has been entirely wiped, the lower arm of the wiper lever runs up the cam 23 on the bar 11 so as to move said lever anti-clockwise into the position in which it is shown in Figure 2. When, prior to the casting of the slugs, the first elevator 20 is moved downwardly to bring the line between the vise jaws 5, the abutment 21 moves the bar 19 downwardly against the action of the spring 22 and this bar carries the bar 11 with it. On the bar 11 is provided a stud 27 which, when the sleeve 9 is in its topmost position as shown in Figure 2, is in engagement with, and limits the upward movement of, that sleeve. When subsequently, the bar 11 is moved downwardly, from the position in which it is shown in Figure 2, the said bar, will take with it the sleeve 9, and also the wiper lever. As the descent of the wiper lever is accompanied by that of the cam 23, the former as indicated in Figure 4 will wipe along the outward edges of the knives 6. The downward movement proceeds until the detent 14 engages the stud 12 and the sleeve 9 is thereby locked in its lowermost position, in which said detent again engages the stud 24, and assumes the position in which it is shown in Figure 1. When the first elevator 20 ascends, the bar 11 under the influence of the spring 17 will be returned to the position in which it is shown in Figure 1.

Having described my invention, I declare that what I claim and desire to secure by Letters Patent is:—

1. Wiping mechanism for matrix composing and line casting machines, with a common wiper for the mold and trimming knives, characterized by the fact that the wiper is pivotally supported by the mechanism actuating it, and is so controlled, that when moved in one direction, it will be brought into position to effect the wiping of the mold, and when moved in the other direction, will bear against and wipe the knives.

2. Wiping mechanism according to claim 1, characterized by the fact that on the side facing the mold, the wiper is provided with projections adapted to engage the aligning grooves on the mold so that when the wiper is moved over the mold slot, it will simultaneously travel along the mold slot and the aligning grooves of the mold.

3. In or for a typographical line casting machine, a wiper for wiping a slotted mold formed with aligning grooves, said wiper having surfaces and projections adapted to simultaneously wipe both the mold and the grooves.

4. In or for a typographical line casting machine, a wiper for wiping a slotted mold having aligning grooves and for also wiping slug trimming knives, said wiper having on the mold-wiping edge surfaces and projections adapted to simultaneously wipe both the mold and the grooves.

5. In or for a typographical line casting machine, a wiper for wiping with one edge a slotted mold having aligning grooves, and for also wiping with its other edge slug trimming knives, said wiper having on the mold-wiping edge surfaces and projections adapted to simultaneously wipe both the mold and the grooves, and on its knife wiping edge a single straight surface for wiping the knives.

6. In or for a typographical line casting machine, a reciprocable wiper adapted when moved in one direction to wipe the mold and when moved in the other direction to wipe the knives.

7. In or for a typographical line casting machine, a reciprocable wiper adapted when moved in respectively opposite directions to wipe the mold and slug trimming knives, and means for holding the wiper out of wiping contact with the knives during its movement in one direction and means for holding the wiper out of wiping contact with the mold during the movement, of the wiper in the other direction.

8. In a typographical line casting machine, mechanism for wiping a mold and slug trimming knives, comprising in combination a wiper, a vertically reciprocable member to which the wiper is pivoted, yielding means operative to move the wiper towards one of the elements to be wiped, during the upward movement of said member, and a cam operative to move the wiper towards the other of the elements to be wiped near the end of said upward movement.

9. In a typographical line casting machine, mechanism for wiping a mold and slug trimming knives, comprising in combination a wiper, a vertically reciprocable sleeve to which the wiper is pivoted, yielding means tending to move the wiper into contact with the mold, a bar vertically movable in the sleeve, and a cam on said bar adapted by relative movement between the bar and sleeve to move the wiper antagonistically to said yielding means into position to contact with the slug trimming knives.

10. In a typographical line casting machine, mechanism for wiping a mold and slug trimming knives, comprising in combination a wiper, a vertically reciprocable sleeve to which the wiper is pivoted, yielding means tending to move the wiper into contact with the mold, a bar vertically movable in the sleeve, a cam on said bar adapted by relative movement between the bar and sleeve to move the wiper antagonistically to said yielding means into position to contact with the slug trimming knives, a spring adapted to move the sleeve upwardly, means operative to move the rod downwardly, a stud on the rod adapted to engage the sleeve and move it downwardly antagonistically to its spring, and a detent adapted to retain the sleeve in its lowered position.

In witness whereof I have affixed my signature hereto.

CHRISTIAN AUGUSTUS ALBRECHT.